United States Patent [19]

Pabodie et al.

[11] 4,290,840
[45] Sep. 22, 1981

[54] LABEL PRINTING AND APPLYING APPARATUS

[75] Inventors: Robert M. Pabodie, Dayton; Paul H. Hamisch, Jr., Franklin, both of Ohio

[73] Assignee: Monarch Marking Systems, Inc., Dayton, Ohio

[21] Appl. No.: 110,733

[22] Filed: Jan. 9, 1980

[51] Int. Cl.³ .............................................. B32B 1/00
[52] U.S. Cl. ...................................... 156/384; 101/288; 101/292; 101/316
[58] Field of Search ............... 156/384, 387; 101/288, 101/291–293, 318–321, 316, 324

[56] References Cited

U.S. PATENT DOCUMENTS

| | | | |
|---|---|---|---|
| 357,801 | 2/1887 | Wheless | 101/321 |
| 741,520 | 10/1903 | Mankiewicz | 101/103 |
| 2,801,583 | 8/1957 | Loushay | 101/316 X |
| 3,112,697 | 12/1963 | Pittman et al. | 101/292 |
| 3,143,963 | 8/1964 | Schrempp | 101/351 |
| 3,364,855 | 1/1968 | Boekeloo et al. | 101/327 |
| 3,491,685 | 1/1970 | Tramposch | 101/350 |
| 3,902,952 | 9/1975 | Penaluna | 156/384 |
| 3,957,562 | 5/1976 | Hamisch | 156/384 |
| 3,968,745 | 7/1976 | Hamisch | 101/111 |
| 4,057,452 | 11/1977 | Yo Sato | 156/384 |
| 4,072,105 | 2/1978 | Becker et al. | 101/288 |
| 4,113,544 | 9/1978 | Yo Sato | 156/384 |
| 4,116,747 | 9/1978 | Hamisch | 156/384 |
| 4,125,419 | 11/1978 | Hamisch | 156/384 X |
| 4,125,420 | 11/1978 | Hamisch | 101/288 X |
| 4,125,421 | 11/1978 | Hamisch | 101/288 X |
| 4,149,462 | 4/1979 | Yo Sato | 101/288 X |

Primary Examiner—David A. Simmons
Attorney, Agent, or Firm—Joseph J. Grass

[57] ABSTRACT

There is disclosed a hand-held label printing and applying apparatus for printing on labels releasably adhered to a web of supporting material, the apparatus having a print head and a platen with an impression control mechanism for the print head, a traveling inker with an easily replaceable inking member, a mechanism for adjusting the registration of a label with respect to the print head, and a return spring subassembly or module which is easy to handle and assemble into operative relation with the remainder of the apparatus.

28 Claims, 16 Drawing Figures

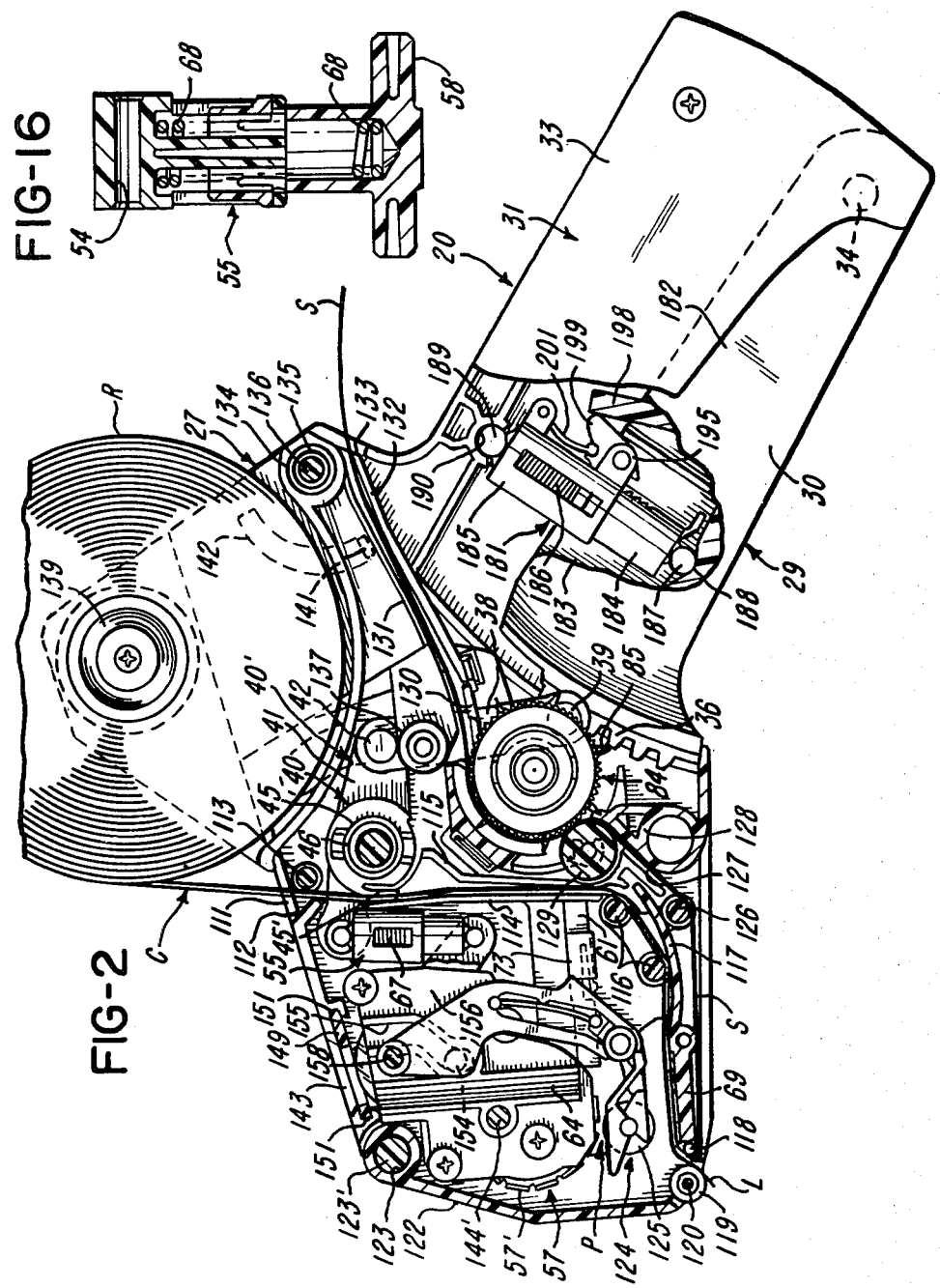

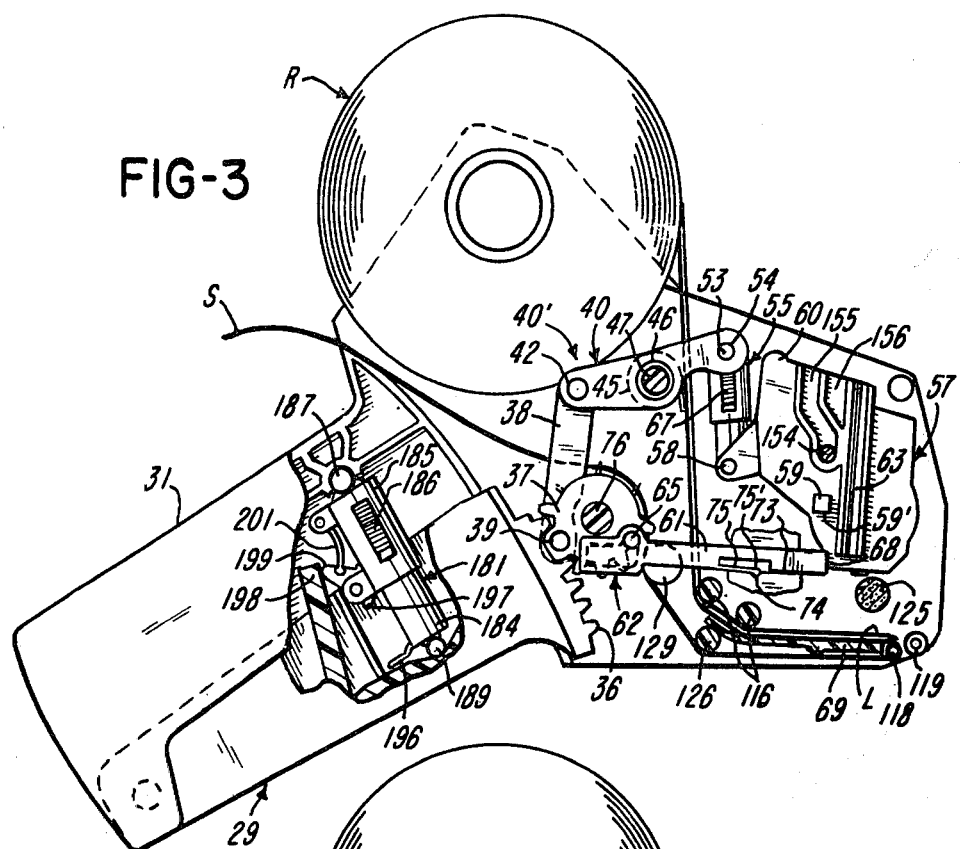
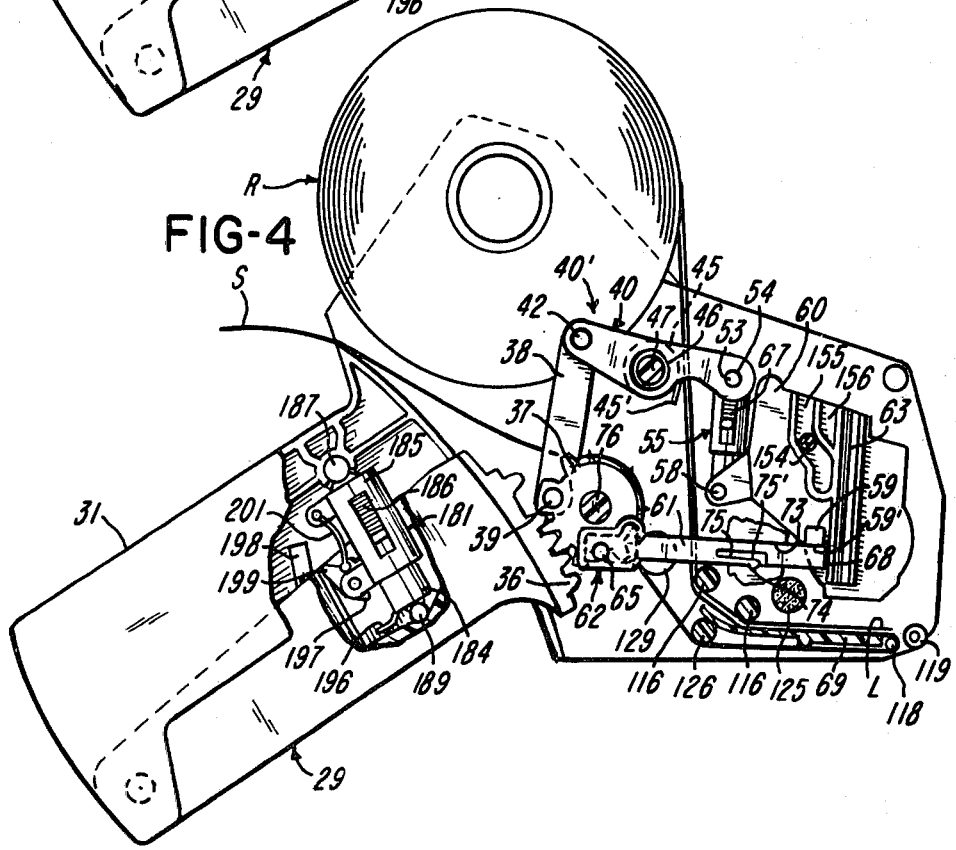

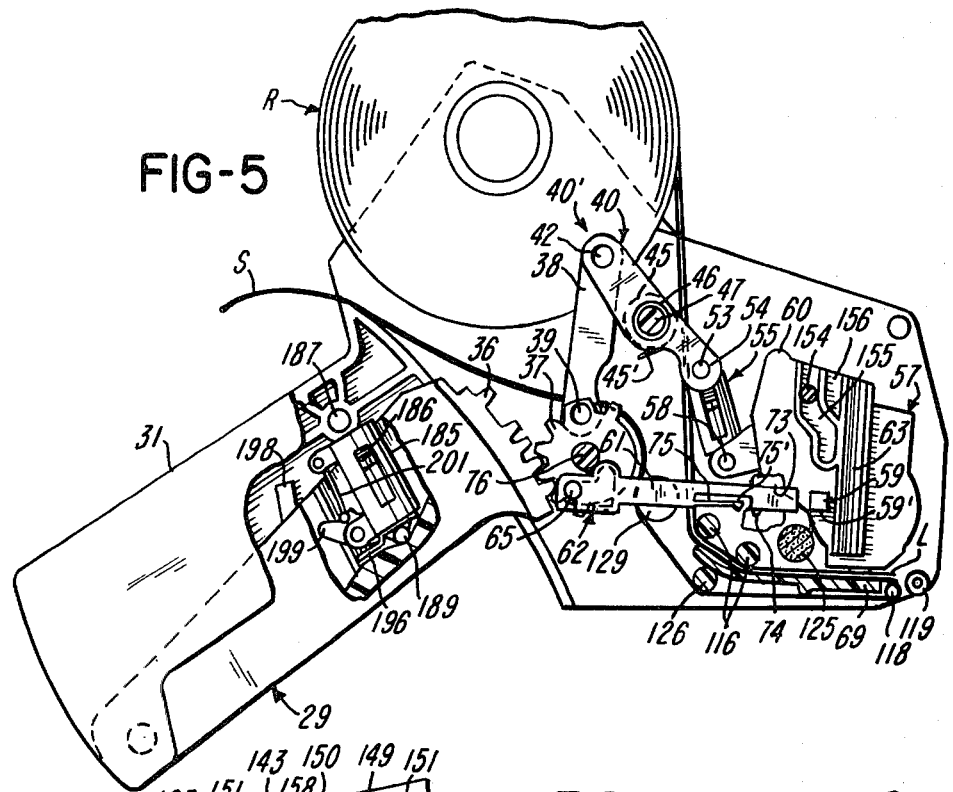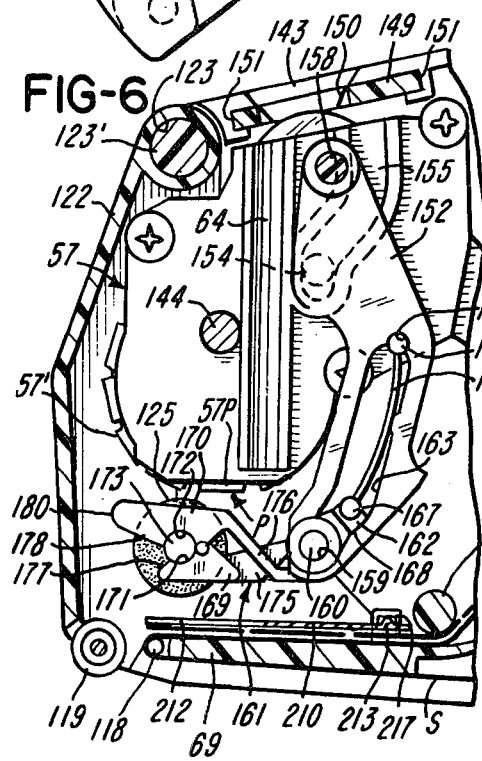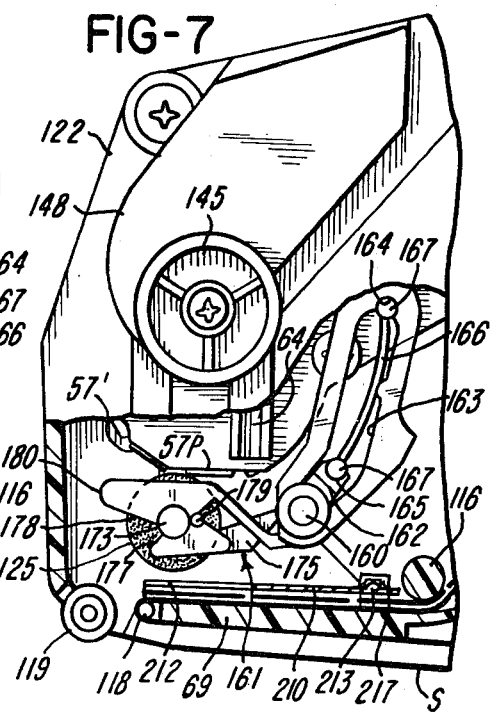

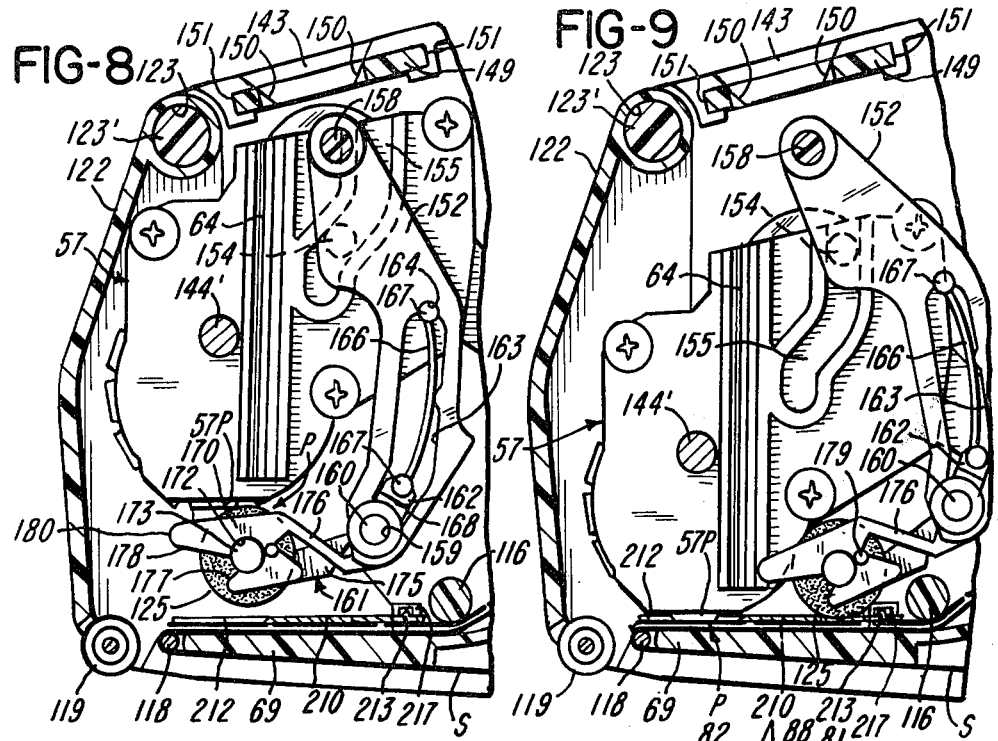
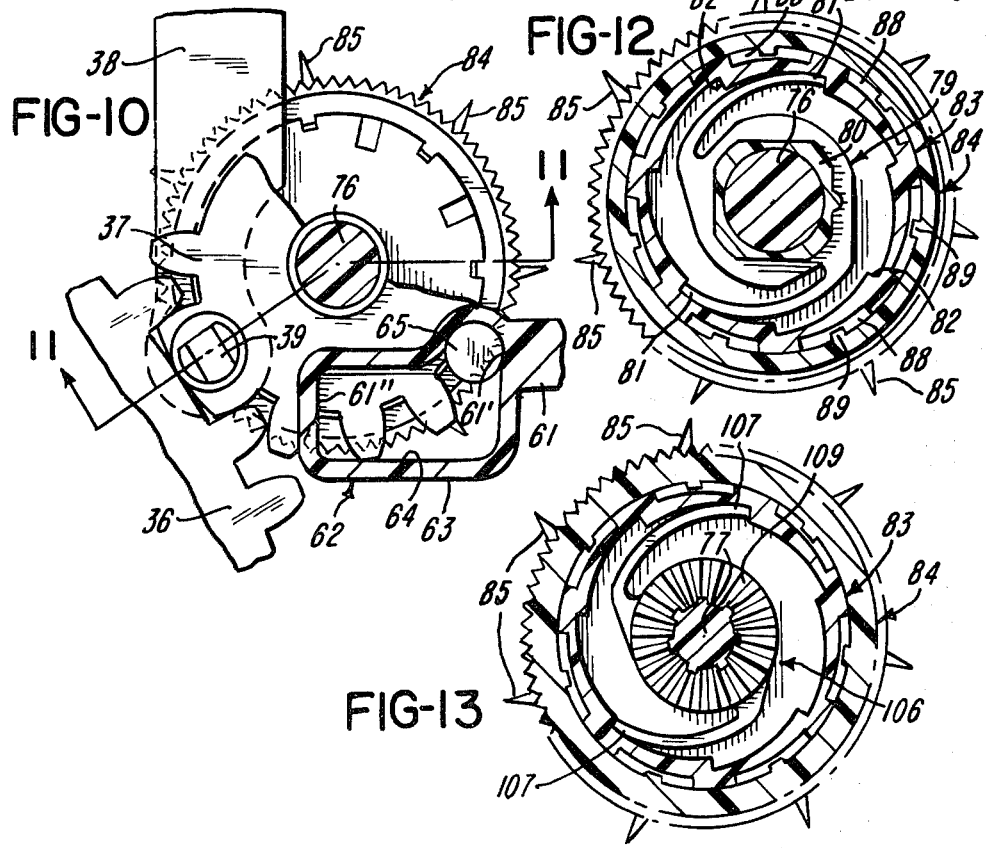

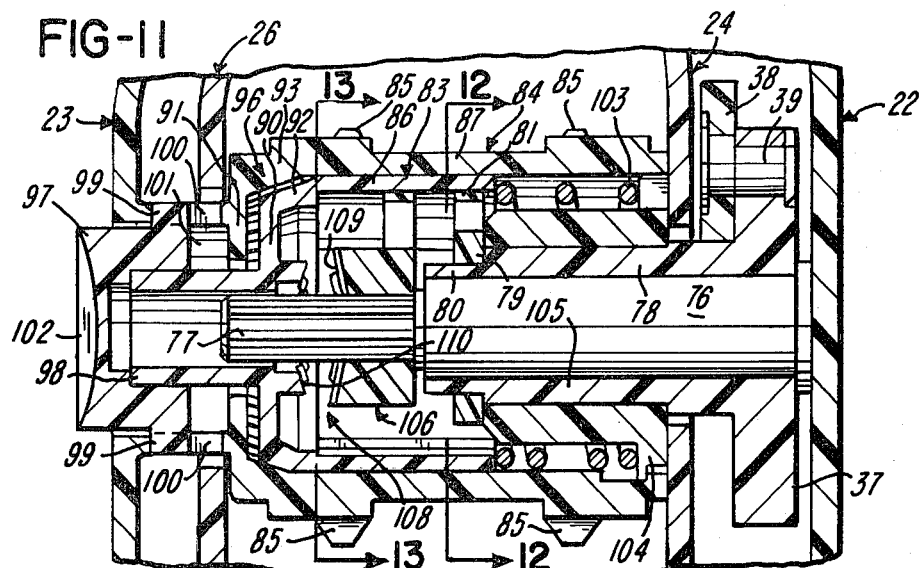
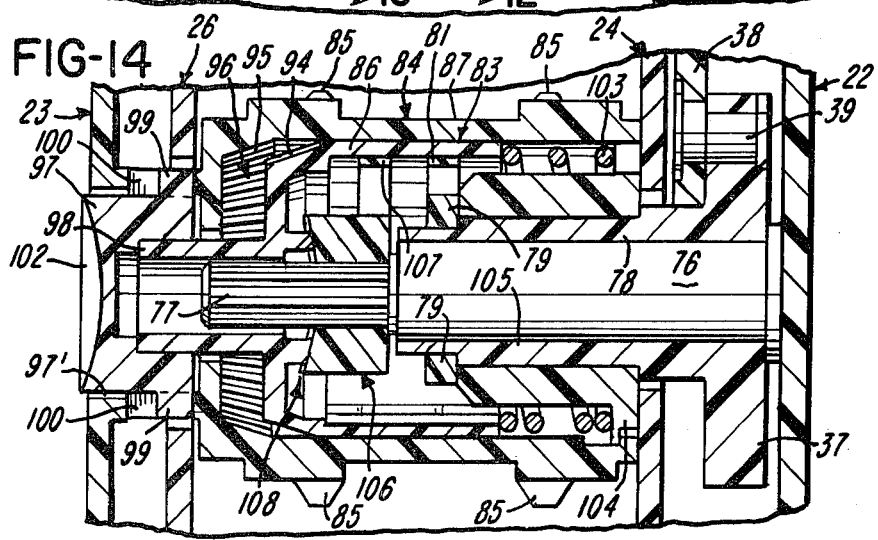
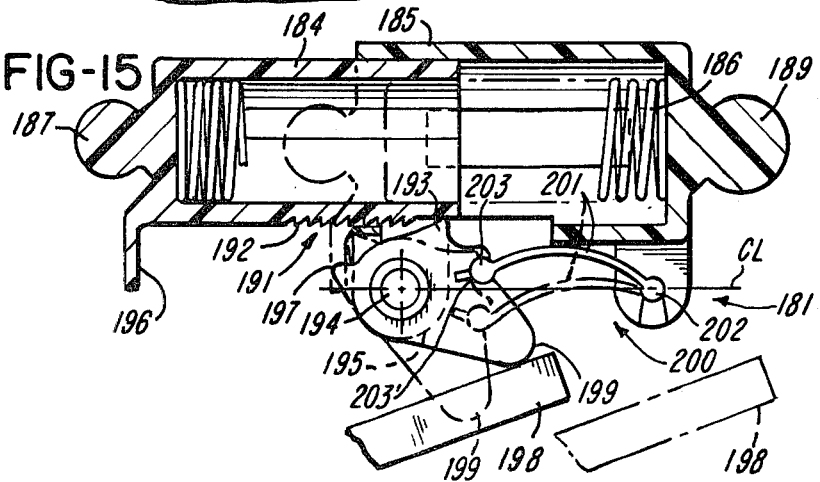

LABEL PRINTING AND APPLYING APPARATUS

BACKGROUND OF THE INVENTION

1. Field of the Invention

This invention relates to the art of label printing and applying apparatus.

2. Brief Description of the Prior Art

The following U.S. patents are made of record: U.S. Pat. Nos. 741,520 granted Oct. 13, 1903 to Mankiewicz; 3,364,855 granted Jan. 23, 1968 to Boekeloo et al; 3,491,685 granted Jan. 27, 1970 to Tramposch; 3,902,952 granted Sept. 2, 1975 to Penaluna; 3,957,562 granted May 18, 1976 to Hamisch, Jr.; 3,968,745 granted July 13, 1976 to Hamisch, Jr.; 4,057,452 granted Nov. 8, 1977 to Yo Sato; 4,072,105 granted Feb. 7, 1978 to Becker et al; 4,113,544 granted Sept. 12, 1978 to Yo Sato; 4,116,747 granted Sept. 26, 1978 to Hamisch, Jr.; 4,125,419 granted Nov. 14, 1978 to Hamisch, Jr.; 4,125,420 granted Nov. 14, 1978 to Hamisch, Jr.; 4,125,421 granted Nov. 14, 1978 to Hamisch, Jr. and 4,149,462 granted Apr. 17, 1979 to Yo Sato.

SUMMARY OF THE INVENTION

The invention relates to a hand-held apparatus for printing and applying pressure sensitive labels releasably carried on a web of supporting material. The apparatus includes an improved arrangement for effecting impression control so that printing impressions on successive labels are essentially the same irrespective of whether the user operates its manually engageable actuator quickly or slowly, or with small or large amounts of actuating pressure. The apparatus, according to a specific embodiment, includes a frame having a handle, an actuator disposed at the handle and moveable between an initial position and an actuated position, a platen, a print head, the print head being mounted for movement into and out of printing cooperation with the platen, means for delaminating printed labels, means for applying printed labels and a linkage including a pivotally mounted lever and a spring device coupled to the lever for coupling the actuator and the print head, means for preventing movement of the print head toward the platen during movement of the actuator from its initial position toward its actuated position until the actuator has moved through a predetermined distance, the spring device enabling the actuator to move from the initial position to the actuated position while the movement of the print head is prevented and means effective when the actuator has moved through a predetermined distance for releasing the print head into printing cooperation with the platen. The print head is preferably mounted for straight line movement toward and away from the platen. More specifically the preventing means includes a latch or interposer and a lost-motion connection for coupling the interposer and the linkage to enable the spring device to load before the interposer is moved to effect release of the print head. According to the preferred embodiment, the actuator includes a lever and a first gear section is coupled to the lever. A second gear section meshes with the first gear section, the second gear section being connected to the linkage.

The invention also includes an inker having an ink roller having spaced shaft portions. The inker includes a pivotally mounted holder for the ink roller. The holder has a pair of spaced sockets for receiving the shaft portions. The holder includes a pair of relatively moveable jaw members which provide the sockets. The one jaw member is composed of flexible resilient material for enabling the socket to receive the respective shaft portion. The holder is mounted by a carrier which is controlled by cam means on the print head. There is means for limiting the pivotal movement of the holder relative to the carrier and means for urging the ink roller in one direction with respect to the print head but enabling the holder to yield upon pressure contact with the print head.

In accordance with another feature of the invention, there is provided a mask for limiting the printing to a single label. The mask is located and configured to block off the printing on the label immediately ahead of the printing zone or printing position. A pair of arms connected to the mask hold down the label which is at the printing position.

BRIEF DESCRIPTION OF THE DRAWINGS

FIG. 2 is a side elevational, partly sectional view of the apparatus, with the various component parts being shown in their initial positions;

FIG. 3 is a elevational view partly in section showing the other side of the apparatus from that shown in FIG. 2, with the component parts being in their initial positions;

FIG. 4 is a view similar to FIG. 3 but showing various component parts moved away from their initial positions toward their actuated positions;

FIG. 5 is a view similar to FIG. 4, but showing various component parts in their actuated positions;

FIG. 6 is an enlarged side elevational view showing the inking mechanism in its initial position;

FIG. 7 is a side elevational view similar to FIG. 6 but showing the print head as contacting the inking member;

FIG. 8 is a side elevational view similar to FIG. 6 showing the inking mechanism traveling relative to the print head;

FIG. 9 is a side elevational view similar to FIG. 8 but showing the inking member as having moved clear of the print head;

FIG. 10 is a fragmentary view showing a portion of the coupling between the print head operating linkage and the interposer;

FIG. 11 is a sectional view of the drive for the feed wheel taken along line 11—11 of FIG. 10;

FIG. 12 is a sectional view taken along line 12—12 of FIG. 11;

FIG. 13 is a sectional view taken along line 13—13 of FIG. 11;

FIG. 14 is a view similar to FIG. 11 but showing the ratchet wheel unclutched from the feed wheel;

FIG. 15 is a sectional view of a subassembly for controlling the return of the component parts to their initial positions; and FIG. 16 is a sectional view of a spring device utilized in the linkage for moving the print head.

DETAILED DESCRIPTION OF THE PREFERRED EMBODIMENTS

Figure 1:
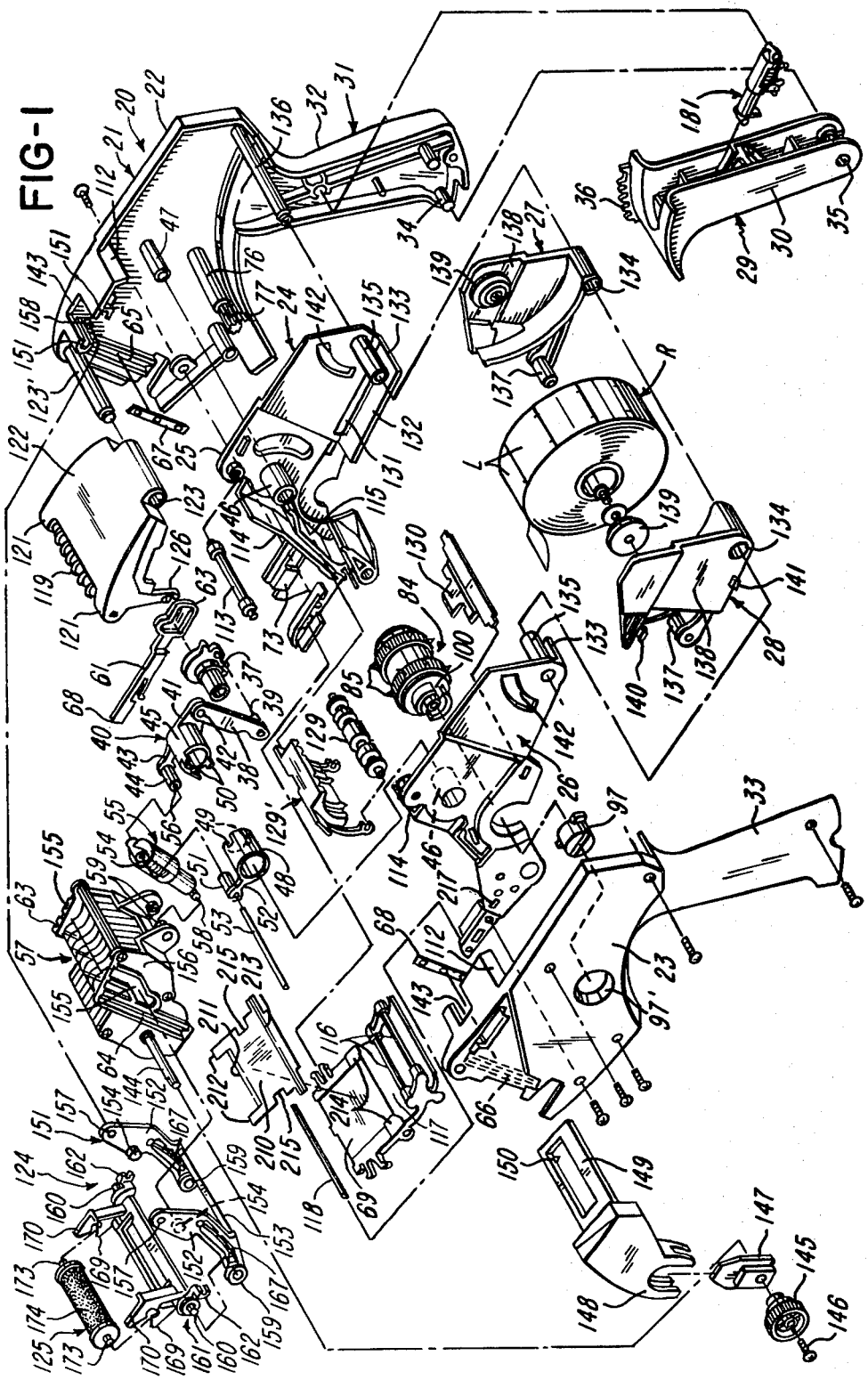
FIG. 1 is an exploded perspective view of a label printing and applying apparatus in accordance with the invention.

With reference to FIG. 1 there is shown a label printing and applying apparatus generally indicated at 20. The apparatus 20 includes a frame generally indicated at 21 having a pair of frame sections 22 and 23. A subframe generally indicated at 24 includes two pairs of subframe sections 25 and 26, and 27 and 28. The apparatus 20 includes an actuator generally indicated at 29 which is shown to take the form of a lever 30. The frame has a handle generally indicated at 31 and includes handle portions 32 and 33 of sections 22 and 23, respectively. The lever 30 is pivotally mounted at the outer end portion of the handle 31 on a post 34 which extends into a hole 35 at the outer end portion of the lever 30. The actuator 29 is coupled to and is preferably molded integrally with a gear section 36. The gear section 36 meshes with a gear section 37. The gear section 37 and the print head 57 are connected by a linkage generally indicated at 40'. The gear section 37 is connected to a link 38 by a pin 39. The link 38 is connected to a two-armed lever generally indicated at 40. The lever 40 has an arm 41 to which the link 38 is connected by a pin 42. The lever 40 also has an arm 43 having a tubular member 44. The lever 40 has a hub 45 pivotally mounted on a tubular post 46. The hub 45 has an integrally formed spring finger or leaf spring 45' which provides a brake. A post 47 is secured to the frame section 22 which extends through the tubular post 46. The bushing 48 axially aligned with a hub 45 is rotatably received about the posts 46 on the subframe sections 24 and 26. The bushing 48 is keyed to the hub 45 by opposed recesses 49 which receive projections 50 on the hub 45. The bushing 48 has an tubular portion 51 connected to the bushing 48 by an arm 52. A pin 53 passes through the tubular portion 51, through a hole 54 in a spring device generally indicated at 55 and into a hole 56 in the tubular member 44. The spring device 55, shown in section in FIG. 16, is connected to a print head generally indicated at 57 by an integral pin 58 pivotally received in opposed tubular members 58'. The linkage 40' is illustrated as including the link 38, the lever 40, and the spring device 55.

With reference to FIGS. 3, 4 and 5, the print head 57 is shown to include a stop 59 having a stop shoulder 59'. The stop 59 is molded integrally with the side plate 60 of the print head 57. An interposer or latch 61 is coupled to the gear section 37 by a lost-motion connection generally indicated at 62 shown in detail in FIG. 10. The interposer 61 has an enlarged portion 63 with an opening 64. Pin 65 integrally connected to the gear section 37 is received in the opening 64. In the position of the pin 65 in the opening 64 as shown in FIGS. 3 and 10, the interposer 61 is in its initial position in the path of the print head stop 59. The print head 57 has opposed ball tracks 63 and 64 and sections 22 and 23 have mating ball tracks 65 and 66. Ball bearing strips 67 and 68 received in respective tracks 63 and 65, and 64 and 66 guide the print head 57 for straight line movement. If the lever is actuated away from its initial position, the gear section 36 rotates the gear section 37 through an arc causing the link 38 to move. The link 38 causes the lever 40 to pivot. The lever 40 drives the spring device 55 which in turn drives the print head 57. When the shoulder 59' of the stop 59 contacts the interposer 61, and assuming continued movement of the actuator 29 from its initial position toward its actuated position, a spring 67 in the spring device 55 is loaded. As the loading continues, the pin 65 moves away from abutment or shoulder 61' (FIG. 10) of the interposer 61 through the position shown in FIG. 4, and when the pin 65 acts upon abutment or shoulder 61" the interposer 61 is shifted. When the interposer 61 has shifted to a position when its terminal end 68 clears the stop shoulder 59', the loaded spring 67 will cause the print head 57 to be driven toward a platen 69 into printing cooperation with a label L. Because of the relative movement between the actuator 29 and the print head 57, the spring device 55 is considered to provide a lost-motion connection. When the actuator 29 is released, a spring 186 in a subassembly 181 returns the actuator 29, the gear sections 36 and 37, the link 38, the lever 40, the spring device 55, the print head 57 and the interposer 61 to their initial positions. During return of these component parts to their initial positions, the pin 65 will leave contact with the abutment face 61" and will move through the position shown in FIG. 4 back to the initial position shown in FIG. 3. By the time the interposer 61 moves back to its initial position, the stop 59 will have cleared the interposer 61 so that there is no interference between the stop 59 and the interposer 61 upon return of the print head 57 to its initial position. The interposer 61 is slidably supported in a guide groove 73. The guide groove has a small recess 74 for receiving end portion 75' of a spring finger or leaf spring 75 formed integrally with the interposer. The spring finger 75 cooperating with the recess 74 provides a detent for holding the interposer 61 in its initial position. Moreover, when the interposer or latch 61 is other than in its initial position, there is frictional drag between the end portion 75' of the spring finger 75 and the guide 73 so that the interposer 61 is not accidentally shifted, for example, when the apparatus is dropped. The guide 73 also supports the interposer 61 against the force exerted by the print head 57 when the spring 67 exerts a force on the print head 57.

In reference to FIG. 1 there is shown a post 76 secured to the frame section 22 and having a splined end portion 77. With reference to FIGS. 11 through 14, the gear section 37 is shown to have a hub 78 rotatably received on the post 76. A pawl member generally indicated at 79 is shown to be secured against rotation to non-circular portion 80 of the hub 78. The pawl member 79 has a pair of flexible resilient drive fingers or pawls 81 cooperable with radially spaced teeth 82 of a ratchet wheel generally indicated at 83. A feed wheel 84 is received about and supported by the ratchet wheel 83. The feed wheel 84 has a plurality of teeth 85 at its outer periphery. As best shown in FIGS. 11 and 14, the ratchet wheel 83 has a tubular portion 86 received within a tubular portion 87 of the feed wheel 84. The outer periphery of the tubular portion 86 has radially spaced axially extending grooves or slots 88 and the inner periphery of the tubular portion 87 has a plurality of projections 89 which extend into the grooves 88. The projections 89 are considerably narrower than the grooves 88 to afford limited rotational travel of the feed wheel 84 relative to the ratchet wheel 83. The ratchet wheel 83 has an end wall 90 joined to the tubular portion 86. The feed wheel 84 has an end portion 91 joined to the tubular portion 87. The ratchet wheel 83 has a frusto-conical portion 92 between the tubular portion 86 and the end wall 90, and the feed wheel 84 has a frusto-conical portion 93 between the tubular portion 87 and the end wall 91. The frusto-conical portions 92 and 93 have respective mating toothed clutch members 94 and 95 best shown in FIG. 14 where the clutch members 94 and 95, which comprise a clutch generally indicated at 96, are shown to be disengaged. The clutch 96 is shown engaged in FIG. 11. A manually engageable, shiftable and rotatable operating member 97 is shown to be rotatably mounted on a tubular portion 98 which is joined to the end wall 90. The member 97 has opposed lugs 99 received in open-ended slots 100 of a tubular portion 101 formed integrally with the end wall 91. In order to disengage the clutch 96, the user depresses the member 97 which in turn moves the clutch member 94 to the right as shown in FIG. 11 to the position shown in FIG. 14. It is preferred to depress the member 97 with a coin received in a coin slot 102 so that when the member 97 is in the position shown in FIG. 14, the coin can be used to rotate the feed wheel 84 in either the forward or the reverse direction to adjust the position to which a label L is brought into registry with the print head 57. The force exerted upon the member 97 by the user overcomes the force of a compression spring 103. When the member 97 is released following adjustment of the feed wheel 84, the spring 103 returns the clutch member 94 into clutching engagement with the clutch member 95. In so doing it is noted that the ratchet wheel 83 is shifted axially with respect to the feed wheel 84. It is also noted that the spring 103 acts against one end of the tubular portion 86 and against a flange 104 of a sleeve 105 received about the hub portion 78. The flange 104 has the additional functions of rotatably mounting the feed wheel 84 and for preventing the ratchet wheel 83 from moving the feed wheel 84 axially against subframe section 26. In order to prevent rotation of the feed wheel 84 while the clutch 96 is engaged, an anti-backup pawl member generally indicated at 106 having a pair of pawls 107 is provided to engage the ratchet teeth 82. In order to prevent the ratchet wheel 83 from rotating when the member 97 is shifted to the position shown in FIG. 14, there is provided a clutch generally indicated at 108. The clutch 108 includes a series of fine teeth 109 formed integrally with the pawl member 106 and a series of mating fine teeth 110 formed integrally with the end wall 90. The teeth 109 and 110 are axially aligned and are shown disengaged in FIG. 11 and engaged in FIG. 14.

With reference to FIGS. 1 and 2, the apparatus 20 is shown to mount a roll R of a composite web C having the labels L releasably carried on a web of supporting material S. As best shown in FIG. 2, the web S passes through an opening 111 bounded by converging portions 112 of frame sections 22 and 23 and a roller 113. From there the web S and the web L which it carries passes between converging guide members 114 and 115. In the position shown in FIG. 2, the brake 45' presses the web C against the guide 114 to clamp the web C against movement in the downstream direction. From there the web S passes between a pair of rollers 116 and a curved guide plate 117 molded integrally with the platen 69. Adjacent the platen 69 is a delaminator 118 for delaminating labels L from the supporting web S. The delaminator 118 is shown to take the form of a peel roller. The leading label L is shown in FIG. 2 to be in label applying relationship with an applicator 119 shown to take the form of a roller. The applicator 119 is shown to be rotatably mounted on a pin or post 120 the end portions of which are received in arms 121 of a member 122. The member 122 has a through-bore 123 at its upper end opposite the applicator 119 for receiving a post 123'. The member 122 serves to shield the print head 57 and inking mechanism 124 from damage when the apparatus 20 is abused and also as a cover to keep dust and the like from entering the space within the frame 21. The member 122 is pivotal to an open position allowing access for cleaning the print head 57 and for changing an inking member 125 of the mechanism 124. The member 122 can be latched to the frame by a pair of opposed latches 126, only one of which is shown.

After passing about the delaminator 118, the web S passes partially around a roller 126 disposed below the plate 117. The roller 126 is also mounted by the platen 69. From there the web S passes between guides 127 and 128. The guide 128 extends to a position opposite a die roller 129 which is contoured to allow clearance for the teeth 85. The die roller is mounted by a holder 129'. The die roller 129 is cooperable with the feed wheel 84 to feed the web S. A stripper 130 strips the web S from the teeth 85. From there the web S passes between guides 131 and 132. Thee guide 131 is part of the subframe section 27 and the guide 132 is part of the subframe section 28. The exit end of the guide 132 is provided with a cutting edge 133 for severing excess amounts of the web S. The subframe sections 27 and 28 have bores 134 for receiving tubular posts 135. A post 136 secured to the frame section 22 extends through the tubular posts 135. The subframe sections 27 and 28 are suitably connected through posts 137 so that the subframe sections 27 and 28 can pivot as a unit about the post 136. The subframe sections have resilient arms 138 which rotatably mount hub members 139. The hub members 130 mount the label roll R. The arms 138 have latches 140 (only one of which is shown) for latching the subframe sections 27 and 28 in the normal position of use as shown in FIG. 2. The subframe sections 27 and 28 have projections 141 received in arcuate slots 142 for limiting the extent to which the sections 27 and 28 can be pivoted into an open position. This pivoting is accomplished to expose the guides 131 and 132 and the feed wheel 83 for cleaning purposes.

The frame sections 22 and 23 have openings 143 which provide a window for observing which printing character 57P is at the printing position P. The print head 57 contains a series of axially aligned printing members 57' which are selectively settable by a selector 144. The selector includes a knob 145. A screw 146 passes through the knob 145 and a connector 147 and is received by a selector shaft 144'. The connector 147 is guided for movement in the same direction as the print head 57. The connector 147 telescopes into a connector 148 formed integrally with an indicator 149. The indicator 149 has a pointer 150 for indicating the printing member 57' with which the selector 144 is coupled. The indicator 149 is slidably mounted in opposed grooves 151. The selector 144 and the indicator 149 are movable in the axial direction, but in addition the selector 144 can be rotated. As the print head 57 moves toward and away from the platen, the telescoping connectors 147 and 148 maintain the lost-motion connection between the selector 144 and the indicator 149. As the selector 144 is shifted axially the connectors 147 and 148 cause the indicator 149 to also be shifted axially as a unit with the selector 144.

With reference to FIGS. 1 and 2, the inking mechanism 124 is shown to include a carrier 151 having a pair of arms 152 joined by a bar 153. The arms 152 have opposed followers 154 received in cam tracks 155 on side plates 156 of the print head 57. The carrier 151 has a pair of aligned holes 157 for receiving posts 158 on the frame sections 22 and 23. Thus, the carrier 151 is pivotally mounted on the frame 21. The pivotal movement of the carrier 151 is controlled by the cam tracks 155 and the followers 154 to cause the inking member 125 to move from the initial positions shown in FIGS. 2, 3 and 6, through the positions shown in FIGS. 7 and 8, and into the fully actuated position as shown in FIGS. 4, 5 and 9 as the print head 57 moves from its initial position to the printing position shown in FIGS. 5 and 9 and vice versa. Referring to FIG. 6, for example, the arms 152 have respective aligned holes 159 for receiving shaft portions 160 of a holder 161. The holder 161 has a pair of arms 162 received in openings 163 (FIG. 6). The arms 152 have concave bearing surfaces 164 and the arms 162 have bearing surfaces 165. A one-piece molded leaf spring 166 has integrally formed bearings 167 captively received at respective bearing surfaces 164 and 165. The springs 166 bias the holder 161 clockwise as viewed in FIG. 6 to a position in which the arms are in abutment with a stop face 168 formed by the openings 163. As shown, the inking member 125 is out of contact with the printing members 57' in the initial position as shown in FIG. 6, for example. When the print head 57 moves to the position shown in FIG. 7, the inking member 125 inks the printing elements 57P which are at the printing position P and the arms 162 move away from the stop face 168 to the position shown in FIG. 7. As the print head 57 continues to move toward the platen 69 to the position shown in FIG. 8, the springs 167 cause the inking member 125 to exert the proper pressure against the printing elements 57P. When the inking member 125 has moved clear of the print head 57, the arms 162 are again in contact with the stop faces 168. The holder 161 includes two pairs of jaw members 169 and 170. Each jaw member 169 has an arcuate surface 171 and each jaw member 170 has an arcuate surface 172. The arcuate surfaces 171 and 172 of the respective jaw members 169 and 170 provide a socket for receiving a respective shaft portion 173 of the inking member 125. The inking member 125 is shown to take the form of a rotatable roll having a circular cylindrical section 174 of porous ink receptive material. The jaw members 169 are unyieldable so that the pressure contact between the inking member 125 and the printing elements 27P is controlled by the springs 166 as is preferred. If desired, however, arms 175 of respective members 169 can be made flexible. The members 169 have respective cam surfaces 177 and the members 170 have respective cam surfaces 178. The movement of each jaw members 170 toward the respective jaw members 169 is limited by a pin 179 on the jaw member 169. The pins 179 are contacted by the respective jaw members 170 in the position shown in FIG. 6. The inking member 125 is securely held in the sockets provided by the opposed pairs of concave surfaces 171 and 172. However, the inking member 125 can be removed by lifting up on a handle 180 to separate the jaw members 169 and 170 to open up the sockets to allow the inking roller to be removed. A new ink roller can be inserted by lining up the shaft portions 173 with the pairs of jaw members 169 and 170 and pushing the shaft portions 173 against the respective cam surfaces 177 and 178 to move the jaw members 170 relative to respective jaw members 169 until the shaft portions 173 are in the position shown in FIG. 6. Accordingly, it is easy to remove a spent inking member 125 and to insert a new inking member 125.

With reference especially to FIG. 2, there is shown a subassembly generally indicated at 181 disposed at and within the handle 31 between legs 182 and 183 of the actuating lever 30. The subassembly 181 has a pair of telescoping members 184 and 185 acted upon by the spring 186. The member 184 has a bearing 187 received against a concave bearing surface 188 of the lever 30 between arms 182 and 183. The member 185 has a bearing 189 received in the concave bearing surface 190 of the handle 31. The subassembly 181 is shown in greater detail in FIG. 15 in both solid line and phantom positions. The telescoping members 184 and 185 have an internal opening for receiving the spring 186. The spring 186 is a compression spring. The subassembly 181 includes a pawl and ratchet mechanism generally indicated at 191 which includes a straight ratchet 192 formed on the outer surface of the telescoping member 184 and a pawl 193 pivotally mounted on a pin 194. The member 185 has a pair of depending arms 195 which receive the pin 194. The pawl 193 is cooperable with successive teeth of the ratchet 192 as the member 184 telescopes into the member 185 when the actuator 29 is moved out of its initial position toward its actuated position. In the event the user should release the actuator 29 before moving the actuator 29 to the actuated position, the pawl 193 cooperates with one of the ratchet teeth 192 to prevent return movement of the actuator 29 and associated component parts until such time as the actuator 29 is fully actuated. When the actuator 29 reaches its actuated position, the interposer 61 has moved clear of the stop 59 and the print head 57 is released to print on the label L and the pawl member 79 has moved far enough to engage a pair of teeth 82. Upon movement of the actuator 29 to its actuated position, the lever 40 has pivoted far enough so that the brake 45' no longer applies braking force to the web C; also a trip member or release member 196 formed integrally with the member 184 will engage an arm 197 of the pawl 193 to pivot the pawl clockwise as viewed in FIG. 15. The return spring 186 is thereupon free to move the telescoping members 184 and 185 relatively apart to return the actuator 29, the gear sections 36 and 37, the link 38, the lever 40, the spring device 55, the print head 57 and the interposer 61 to their initial positions. Also the pawl member 79 drives the ratchet wheel 83 to drive the feed wheel 84 to advance the web S. When the actuator 29 is in its initial position, the cam 198 acting on an arm 199 of the pawl 193 moves into the solid line position shown in FIG. 15 to pivot the pawl 193 counterclockwise thus initiating movement of the pawl 193 to its initial position. The pawl 193 is controlled by an overcenter mechanism generally indicated at 200 which includes a leaf spring 201 having integrally formed bearings 202 and 203. The bearing 202 and the pin 194 are on the same centerline CL. In the initial position the bearing member 203 which is rotatably received by the pawl 193 in a socket 303' tends to hold the pawl 193 in the initial position. When the member 196 acts on the arm 197 and the pawl 193 is pivoted clockwise, the spring 201 is flexed and as soon as the bearing 203 exerts an overcenter force on the pawl 193, the pawl 193 is quickly moved to the phantom line position shown in FIG. 15.

In order to assure that printing is limited to the label L at the printing zone or position P, a mask 210 is provided to cover the immediately adjacent upstream label. The mask 210 is thin and tapers to a feathered edge 211. A pair of spaced arms 212 hold down marginal side edges of the label at the printing position. The mask 210 has a lateral strengthening rib 213. The platen 69 has spaced apart posts 214 cooperable with cutouts 215 in the mask 210 to locate the mask 210 and its hold down fingers 212 relative to the platen 69. The mask 210 has a pair of projections 216 at the rib 213. The projections are received and held in pockets 217 in subframe sections 24 and 26.

When getting ready to operate the apparatus 20, the various printing members 57' are first set by selectively shifting and rotating the selector 144 so that their printing elements 57P print the desired data. The actuator 29, the print head 57 and the intermediate linkage 40', the interposer 61, and the inking mechanism 24 are in their initial positions in FIG. 2. The handle 31 is manually grasped and the user's fingers are used to operate the actuator 29. Upon operation of the actuator 29, the gear section 36 moves the gear section 37, the gear section 37 moves the link 38 which pivots the lever 40. The lever 40 moves the spring device 55 without compressing the spring 67 and in turn the spring device 55 moves the print head 57 toward the platen 69. During movement of the actuator 29, the pawl 193 cooperates with successive teeth of the ratchet 192 and the pawl member 79 also moves. Thus, release of the actuator 29 does not allow either the actuator 29, the gear sections 36 or 37, the linkage 40' or the print head 57 to return to their initial positions and does not allow the pawl member 79 to move the feed wheel 84 because the pawl 193 has not moved far enough. When the stop 59 contacts the interposer 61 the movement of the print head 57 is arrested even though the user continues to move the actuator 29 toward its actuated position. This causes the pin 65 to contact abutment face 61' to move the interposer 61 out of the path of the stop 59. When the interposer 61 has moved clear of the stop 59, the spring 67 fires the print head 57 into printing cooperation with the platen 69. Slight additional movement of the actuator 29 will cause the release member 196 to move the pawl 193 to its overcenter position so that the actuator 29 can return to its initial position. By the time the release member 196 actuates the pawl 193, the pawl member 79 has moved to a position in which the pawls 81 are in the path of the next adjacent teeth so that release of the actuator 29 will cause the ratchet wheel 83 to drive the feed wheel 84 through the engaged clutch 96. During movement of the actuator 29 toward the actuated position, the inking mechanism 124 moves through the positions shown successively in FIGS. 6 through 9 and the opposite movement occurs when the actuator 29 is released. The brake 45' has moved to its ineffective position when the actuator 29 is in its actuated position and remains in its ineffective position until the actuator 29 has returned very close to its initial position shown in FIG. 2. When the actuator 29 returns to its initial position, the cam 198 causes return of the pawl 193 into a ratcheting position in cooperation with the ratchet 192 and return of the print head 57, the linkage, the gear sections 36 and 37 and the interposer 61 to their initial positions.

All parts of the apparatus are preferably composed of molded plastics materials except various connecting screws, springs 67, 103 and 186, and the ink roller 125, thus making for a durable, lightweight low-cost apparatus 20.

Other embodiments and modifications of this invention will suggest themselves to those skilled in the art, and all such of these as come within the spirit of this invention are included within its scope as best defined by the appended claims.

We claim:

1. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, means coupling the actuator and the print head, the coupling means including a link, a pivotally mounted lever having arms, means pivotally connecting the link and one arm of the lever, a spring device, means pivotally connecting another arm of the lever and the spring device, means for preventing movement of the print head toward the platen during a portion of the movement of the actuator from its initial position to its actuated position to load the spring device, and means effective when the actuator has moved through a predetermined distance for releasing the print head into printing cooperation with the platen.

2. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, means coupling the actuator and the print head, the coupling means including a first gear section coupled to the actuator, a second gear section meshing with the first gear section, and a spring device, means for preventing movement of the print head toward the platen during a portion of the movement of the actuator from its initial position to its actuated position to load the spring device, the spring device enabling the actuator to move from the initial position toward the actuated position while movement of the print head is prevented, and means effective when the actuator has moved through a predetermined distance for releasing the print head into printing cooperation with the platen.

3. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, a first gear section coupled to the actuator, a second gear section meshing with the first gear section, a linkage including a pivotally mounted lever and a spring device for coupling the second gear section and the print head, means for preventing movement of the print head toward the platen during a portion of the movement of the actuator from its initial position to its actuated position to load the spring device, the spring device enabling the actuator to move from the initial position toward the actuated position while the movement of the print head is prevented, and means effective when the actuator has moved through a predetermined distance for releasing the print head into printing cooperation with the platen.

4. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, a linkage including a pivotally mounted lever and a spring device coupled to the lever for coupling the actuator and the print head, means for preventing movement or the print head toward the platen during a portion of the movement of the actuator from its initial position to its actuated position to load the spring device, the spring device enabling the actuator to move from the initial position toward the actuated position while the movement of the print head is prevented, means effective when the actuator has moved through a predetermined distance for releasing the print head into printing cooperation with the platen, the movement preventing means including an interposer and means including a lost-motion connection for coupling the interposer and the linkage enabling the spring device to load before the interposer is moved to effect release of the print head.

5. Hand-held apparatus as defined in claim 4, wherein the interposer comprises a slide mounted for sliding movement relative to the frame, the print head having means defining a shoulder, the slide acting on the print head shoulder until the slide has moved clear of the shoulder.

6. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, means coupling the actuator and the print head, the coupling means including a first gear section coupled to the actuator, a second gear section meshing with the first gear section, and a spring device, means for preventing movement of the print head toward the platen during a portion of the movement of the actuator from its initial position to its actuated position to load the spring, the spring device enabling the actuator to move from the initial position toward the actuated position while movement of the print head is prevented, means effective when the actuator has moved through a predetermined distance for releasing the print head into printing cooperation with the platen and wherein the preventing means includes an interposer coupled to the second gear section and acting on the print head.

7. Hand-held apparatus as defined in any one of claims 4, 5 or 6, including a detent for releasably holding the interposer in an initial position.

8. Hand-held apparatus as defined in any one of claims 4, 5 or 6, including a frictional device for preventing movement of the interposer except when driven.

9. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, a first gear section coupled to the actuator, a second gear section meshing with the first gear section, a linkage including a pivotally mounted lever and a spring device for coupling the second gear section and the print head, coupled to the second gear section for preventing movement of the print head toward the platen during a portion of the movement of the actuator from its initial position toward its actuated position to load the spring device, the spring device enabling the actuator to move from the initial position toward the actuated position while the movement of the print head is prevented, and means effective when the actuator has moved through a predetermined distance for releasing the print head into printing cooperation with the platen.

10. Apparatus as defined in claim 9, wherein the spring device includes a compression spring.

11. Apparatus as defined in claim 9, including means defining a path for travel of the web, and means disposed adjacent the path upstream of the delaminating means and connected to the linkage for applying a braking force to the web.

12. Apparatus as defined in claim 11, wherein the braking means includes a flexible resilient arm molded integrally with the lever.

13. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement into and out of printing cooperation with the platen, means disposed adjacent the platen for delaminating printed labels, means for applying the printed labels, a first gear section coupled to the actuator, a second gear section meshing with the first gear section, a pivotally mounted lever, a link connecting the second gear section and the first lever, and a spring device connected to the lever and to the print head, means for preventing movement of the print head toward the platen during a portion of the movement of the actuator from its initial position to its actuated position to load the spring device, the spring device enabling the actuator to move from the initial position toward the actuated position while the movement of the print head is prevented, and means effective when the actuator has moved through a predetermined distance for releasing the print head into printing cooperation with the platen.

14. In a hand-held label printing and applying apparatus for printing and applying labels releasably carried on a web of supporting material, a frame having a handle, printing means, means for advancing the web, means for delaminating a printed label, a manually operable actuator disposed at the handle, and means coupled to the actuator for driving the printing means to print on the labels and for moving the web advancing means to effect label delamination, an inking mechanism wherein the inker includes an ink roller having spaced shaft portions, a pivotally mounted holder for the ink roller, the holder having means providing a pair of spaced sockets for receiving the shaft portions, the improvement comprising that the holder has at least one pair of relatively movable jaw members, the jaw members providing one of the sockets, one jaw member including an arm comprised of a flexible resilient material for enabling the respective socket to open to receive a respective shaft portion, the printing means includes a laterally extending print head, wherein the ink roller extends laterally and is positioned to ink the print head, means for applying a printed label disposed at the front end portion of the frame, a member for shielding the print head disposed at the front end portion of the frame adjacent the label applying means, the print head and the ink roller, and means movably mounting the member to the frame to provide access to both the print head and the ink roller.

15. Printing apparatus, comprising: a movably mounted print head, a traveling inker including a carrier, means for pivotally mounting the carrier, an inking member, a holder for the inking member, means pivotally mounting the holder to the carrier, means for limiting the pivotal movement of the holder relative to the carrier, means for urging the ink roller in one direction with respect to the print head but enabling the holder to yield upon pressure contact with the print head, wherein the carrier includes a pair of arms, means rigidly connecting the arms for movement as a unit, the arms having respective first bearing surfaces, the holder having second bearing surfaces, a pair of leaf springs each having first and second bearing surfaces, each leaf spring first bearing surface acting on a respective arm first bearing surface and each leaf spring second bearing surface acting on a respective holder second bearing surface, the arms having openings, the limiting means comprising a pair of projections received in the openings, the leaf spring being received in the openings, the carrier and the holder being composed of molded plastics material.

16. Printing apparatus comprising: a movably mounted print head, a traveling inker including a carrier, means for pivotally mounting the carrier, an inking member, a holder for the inking member, means pivotally mounting the holder to the carrier, means for limiting the pivotal movement of the holder relative to the carrier, means for urging the ink roller in one direction with respect to the print head but enabling the holder to yield upon pressure contact with the print head, wherein the print head has a pair of cam tracks, means mounting the print head for straight line movement, the carrier having a pair of followers received in the respective cam tracks so that movement of the print head causes traveling movement of the inker through a cycle as the print head moves into and out of printing cooperation with the platen, the cycle involving no movement of the inker as the print head moves into contact with the inking member and involving traveling movement of the inker as the print head continues to move toward the platen.

17. In a hand-held label printing and applying apparatus for printing and applying labels releasably carried on a web of supporting material, a frame having a handle, printing means, means for advancing the web, means for delaminating a printed label, a manually operable actuator disposed at the handle, means coupled to the actuator for driving the printing means to print on the labels and for moving the web advancing means to effect label delamination, the printing means including a print head and a cooperable platen, the improvement comprising a mask disposed adjacent the platen for limiting the printing to a single label, a subframe mounted by the frame, means connecting the platen to the frame, guide means mounted by the platen for guiding the web to beneath the mask, the print head and the platen being cooperable to print on a label at a printing position, thee mask having a pair of spaced hold down members formed integrally with the mask for holding down the label which is at the printing position, the mask acting to mask off the leading marginal edge of a label upstream of the printing position.

18. In an apparatus as defined in claim 17, the improvement further comprising means for locating the mask and the hold-down members with respect to the platen.

19. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement between an initial position away from the platen and a printing position in cooperation with the platen, means disposed adjacent the platen for delaminating printed labels, means coupled to the actuator for moving the print head, the moving means including a linkage having a spring device, the print head having means defining a shoulder movable in a straight path, an interposer alternately movable between an effective position in the path of the shoulder and an ineffective position out of the path of the shoulder, the interposer being in the effective position in the initial position of the print head, the shoulder being spaced from the interposer in the initial position of the print head, the spring device being loaded when the actuator is operated and the linkage moves and drives the print head shoulder against the interposer during a portion of the movement of the actuator from its initial position to its actuated position, and means coupling the interposer and the moving means for moving the interposer out of the path of the shoulder to release the print head into printing cooperation with the platen.

20. Hand-held apparatus as defined in claim 19, wherein the means coupling the interposer and the moving means includes a lost-motion connection.

21. Hand-held apparatus as defined in claim 17, wherein the moving means includes a first gear section coupled to the actuator and a second gear section meshing with the first gear section, means coupled to the second gear section for advancing the web, wherein the means coupling the interposer and the moving means includes a lost-motion connection coupled to the second gear section, and means connecting the second gear section and the linkage.

22. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head for straight line movement between an initial position away from the platen and a printing position in cooperation with the platen, means disposed adjacent the platen for delaminating printed labels, means coupled to the actuator for moving the print head, the moving means including gearing and a spring device driven by the gearing, the print head having means defining a shoulder movable in a straight path, an interposer alternatively movable between an effective position in the path of the shoulder and an ineffective position out of the path of the shoulder, the interposer being in the effective position in the initial position of the print head, the shoulder being spaced from the interposer in the initial position of the print head, the spring device being loaded when the actuator is operated and the gearing moves and drives the print head shoulder against the interposer during a portion of the movement of the actuator from its initial position to its actuated position, and means coupling the interposer and the moving means for moving the interposer out of the path of the shoulder to release the print head into printing cooperation with the platen.

23. Hand-held apparatus as defined in claim 22, wherein the means coupling the interposer and the moving means includes a lost-motion connection.

24. Hand-held apparatus as defined in claim 22, wherein the gearing includes a first gear section coupled to the actuator and a second gear section meshing with the first gear section, means coupled to the second gear section for advancing the web, wherein the means coupling the interposer and the moving means includes a lost-motion connection coupled to the second gear section, and wherein the moving means further includes means coupling the second gear section and the spring device.

25. Hand-held apparatus for printing and applying pressure sensitive labels releasably carried on a web of supporting material, comprising: a frame having a handle, an actuator disposed at the handle, a platen, a print head, means mounting the print head for movement in a straight path into and out of printing cooperation with the platen, means for inking the print head including a traveling inker having a carrier, means for pivotally mounting the carrier, a holder pivotally mounted to the carrier, an ink roller rotatably supported by the holder, means for urging the holder and the ink roller which it carries in one direction relative to the print head but enabling the holder to yield upon pressure contact with the print head, means responsive to movement of the actuator for moving the print head into and out of printing cooperation with the platen, the ink roller being spaced from the print head in the initial position of the actuator and in the initial position of the print head, means for limiting the pivotal movement of the holder and the ink roller in the one direction, and cam means controlled by the print head and acting on the carrier for moving the holder and the ink roller generally laterally with respect to the path of movement of the print head to ink the print head.

26. Hand-held apparatus as defined in claim 25, wherein the cam means includes a pair of cam tracks and a pair of follower means confined in the cam tracks to effect movement of the ink roller throughout a complete cycle.

27. Hand-held apparatus as defined in claim 25, wherein the cam means includes means for driving the inker in opposite directions through a complete cycle.

28. Hand-held apparatus as defined in claim 25, wherein the cam means includes a pair of cam tracks on the print head and a pair of followers on the carrier received in the cam tracks.

* * * * *

UNITED STATES PATENT AND TRADEMARK OFFICE
CERTIFICATE OF CORRECTION

PATENT NO. : 4,290,840
DATED : September 22, 1981
INVENTOR(S) : Robert M. Pabodie and Paul H. Hamisch, Jr.

It is certified that error appears in the above-identified patent and that said Letters Patent are hereby corrected as shown below:

Column 6, line 13, "Thee" should be --The--. Column 8, line 49, "303' " should be --203'--. Column 11, line 7, "or" should be --of--. Column 13, line 66, "thee" should be --the--. Column 14, line 60, "alternatively" should be --alternately--.

Signed and Sealed this

Twenty-second Day of December 1981

|SEAL|

Attest:

GERALD J. MOSSINGHOFF

Attesting Officer    Commissioner of Patents and Trademarks